Aug. 18, 1931.  O. T. FRANCIS  1,819,599
TRANSMISSION SYSTEM
Filed Jan. 28, 1929   2 Sheets-Sheet 1

INVENTOR:
Oliver T. Francis,
BY
ATTORNEYS

Aug. 18, 1931.  O. T. FRANCIS  1,819,599
TRANSMISSION SYSTEM
Filed Jan. 28, 1929  2 Sheets-Sheet 2

INVENTOR:
Oliver T. Francis,
BY
Spear, Middleton, Donaldson & Hall
ATTORNEYS

Patented Aug. 18, 1931

1,819,599

UNITED STATES PATENT OFFICE

OLIVER T. FRANCIS, OF QUANTICO, VIRGINIA

TRANSMISSION SYSTEM

Application filed January 28, 1929. Serial No. 335,655.

This invention relates to electric receiving and transmitting circuits, and more particularly to a means of utilizing differences in signal strength of pulses of current sent out by the transmitting station to produce predetermined operations at the receiving station.

It is well known that with present day transmitting and receiving systems, it is necessary to send out several pulses of current to produce a single operation. In the printer telegraph system for exar ple, five pulses of current are sent out by the transmitting station to produce one letter at the receiving station. Such systems require elaborate mechanical distributing systems, at both the sending and receiving stations, including means of synchronization, which not only have the disadvantage of easily getting out of synchronism, but also require mechanical moving parts, which require time for operation. It is further known that television systems utilize similar synchronous mechanical collectors and distributors, and require extremely wide bands for the performance of the desired operation at the receiving station.

It is the object of this invention to provide a means whereby these operations may be performed by a single pulse sent out from the transmitting station, the strength of said pulse being the determining factor as to the operation performed at the receiving station, thereby making it possible to perform operations by means of continuous wave single pulses, which heretofore have been performed only either by a series of pulses, or by the utilization of a very wide band of frequencies.

Another object is to utilize the principles of ionization of gases, and electron emission and a means of photographic recording of signals received, all of which processes, as is well known, are almost instantaneous, thereby getting away from the great time element utilized by mechanical selectors, where mechanical operations are involved.

With these and other objects in view, the invention may be more readily understood by reference to the following description in connection with the following drawings, which show diagrammatically the functioning of the system.

Figure 1:
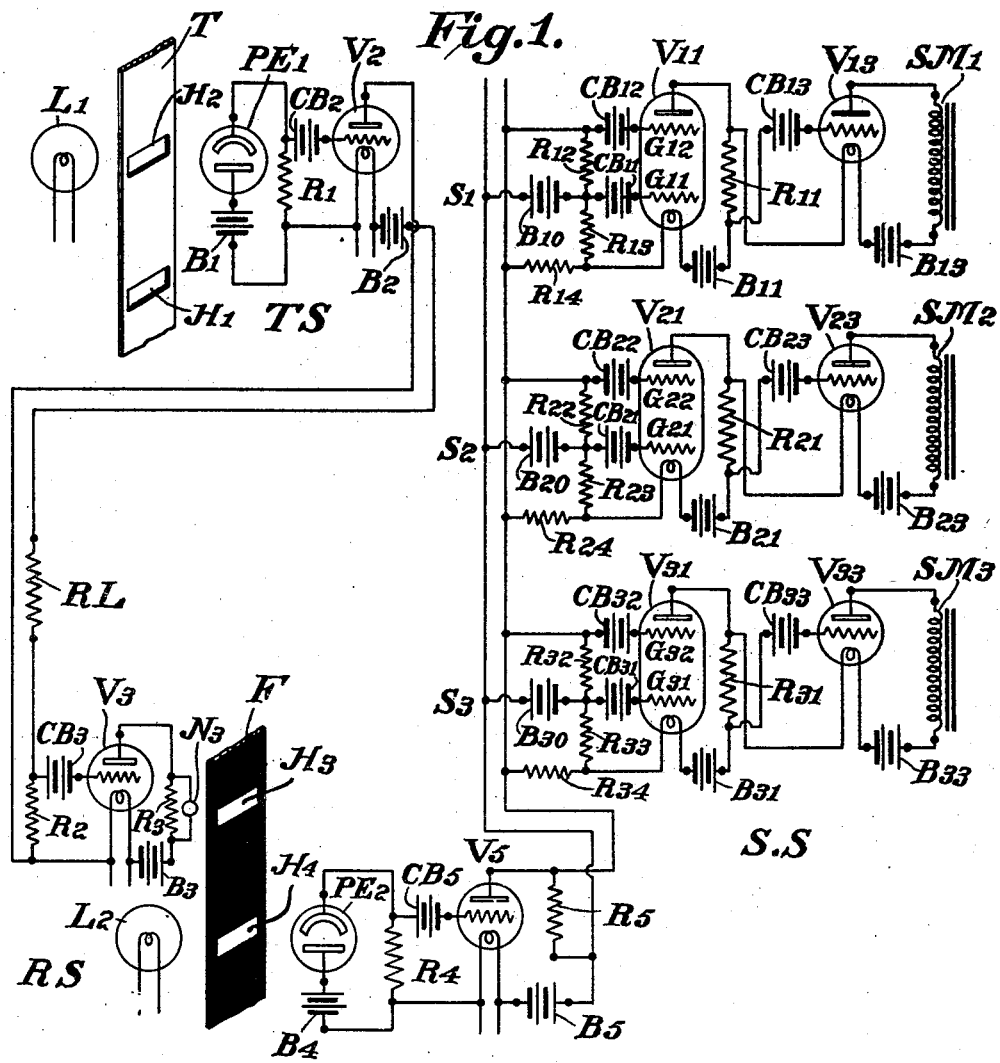
Figure 1 shows a transmitting and receiving station for telegraphic messages.

Referring to Fig. 1, we find transmitting station TS composed of source of light L1, tape T in which holes H1 and H2 have been cut by typewriter tape cutter (not shown); photo-electric cell, PE1, capacitated by a means similar to that used in presenting talking motion pictures to vary its resistance in accordance with the amount of light it receives through hole H2 in Tape T, battery B1 which impresses a direct current voltage on PE1; coupling resistance R1; vacumm tube amplifier system V2; C battery CB2, which biases V2 to such a negative voltage that when no signal is being received very little current will flow in the output circuit thereof. Battery B2 furnishes current to vacuum tube V2, and resistance of line RL (ordinarily about 4000 ohms), connects the transmitting and receiving stations.

Receiving station RS, is composed of vacuum tube V3, biased by C battery CB3 to such a negative potential that when no signal is being received, very little current will flow in the output circuit thereof; R2 couples V2 and V3; battery B3 impresses a high voltage on V3 through resistance R3. In parallel with R3 is neon lamp N3 which breaks down when a signal is impressed on V3 by the transmitting station. The brightness of the light is recorded on film F, in a manner similar to that used in recording variations in voice currents in talking motion pictures, by running the film through a recorder at a high rate of speed, the current varying the intensity of the light from neon lamp N3, the light from which is permitted to reach a highly sensitized negative film through a slit, and cause the negative after being developed to be opaque in varying degrees depending on the magnitude of the current flowing in line RL. A permanent positive film is then made from this negative, thereby causing bright spots H3 and H4 in film F, each of which spots represent one letter of the alphabet depending on its transparency. This positive is then run through a projector at a comparatively slow rate of speed. A beam of light of high intensity passes through the film record H4, and is concentrated by lenses upon photo-electric cell PE2, and produces one pulse of current corresponding in magnitude to the pulse of current which flowed in line RL, and caused bright spot H4. Battery B4, impresses a varying potential on R4 as the resistance of PE2 is varied. C battery CB5 impresses such a negative potential on V5, that when the IR drop across R4 is small, very little current will flow through load resistance R5.

Selector system SS is composed of selector sections S1, S2, S3, capacitated to operate selector magnets SM1, SM2, SM3, each of which causes one letter to be printed by telegraph printer (not shown). While three of the selector magnets are shown it is obvious that thirty or more would be required to operate the telegraph printer. These selector sections are similar in construction and operation. S1 is composed of four element tube V11, wherein grid G11 is biased negative by CB11, so that when no signal is impressed thereon very little current will flow in the output circuit thereof. G12 is biased positive. As the current through R5 increases both G11 and G12 tend to assume a zero potential with respect to the filament of V11. This is due to the fact that R13 and R14 are equal in value. If, however, the current tends to increase through R5 beyond this predetermined value, the grid G11 will tend to become further positive but the grid of G12 will become negative and as a result oppose the passage of electrons through V11. The values of B10, B20, B30 determine the operating potentials of these sections. As these batteries are of different values the operating point of each section is different. The maximum IR drop across R11 is sufficient to overcome the negative bias impressed by C battery CB13 on V13, thereby allowing a large current to flow through SM1 from battery B13, and operate selector magnet SM1, which prints one letter of the printer telegraph to the exclusion of all of the other letters.

The processes involved in the above description up to the point where V5 causes a current to flow through resistance R5, are so similar to those used in the recording and presenting of the talking motion pictures today that they are not regarded as needing further explanation at this point. It is believed well to illustrate the functioning of the selector system SS by assuming a specific example, however.

Assume V5 to be a large power tube similar to those ordinarily known as the UX250. Assume that sufficient positive potential is impressed on the grid of V5 to cause twenty-six volts drop across R5. As B20 is twenty volts, six volts of positive potential will be impressed on V21. As R23 and R24 are each assumed to be one megohm and thus there will be three of the six volts drop across each, this will cause G21 to become three volts more positive with respect to the filament of V21 than when no current is flowing through R23. As CB21 impresses a negative potential of one and a half volts on G21, the actual grid bias is now one and one half volts positive. This voltage has also caused six volts drop across R22. Subtracting the IR drop of three volts across R23 from the six volts drop across R22, we find that the grid G22 has been made three volts more negative with respect to the filament of V21, by this current. As CB22 biases G22 to four and a half volts positive the actual bias on G22 is one and one half volts postive with respect to the filament of V21. Therefore neither of these grids will impede the passage of electrons through V21, both being one and one-half positive bias, and there will be a comparatively large IR drop across R21, which in turn causes a large current to flow through SM2. V23 in the present instance is a large power tube capable of furnishing sixty milliamperes and selector magnet SM2 is capable of operating on considerably less than forty milliamperes.

This voltage from V5 will not cause selector magnets SM1, or SM3 to operate however. In the case of V11, the grid G11 will assume a positive potential, but the grid G12 will assume a negative potential of three and one-half volts. This is due to the fact that operating point battery, B10 is only ten volts and consequently the plate impedance of V11 will remain very great with the resultant small IR drop across R11 and small current. In the case of V31, G31 will remain at a negative potential as B30 is here thirty volts with the resultant high impedance of V31 and small IR drop across R31.

It is apparent that this system will allow for high speed transmission over line RL and a comparatively slow rate of operation of the printer to allow time for the mechanically moving parts connected therewith, since it is possible to record the magnitude of pulses of current flowing in line RL at an extremely high rate of speed, and run the developed film before photo-electric cell PE2 at a comparatively slow rate of speed.

Figure 2:
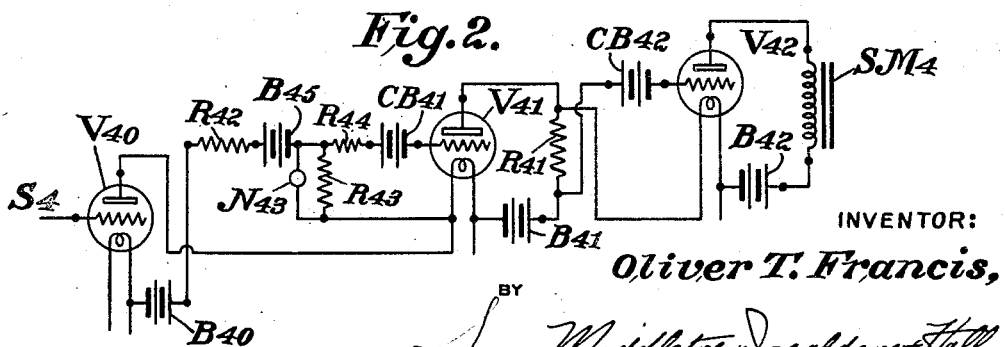
Fig. 2 shows one of the selector sections thereof utilizing a three element tube.

An analysis of the above selector system will show that one of the grids of the four element tubes has been used to impede the passage of electrons when the voltage impressed on the selector section of which it is a part, is above a predetermined value and the other grid thereof has been used to impede the passage of electrons when the voltage impressed on said selector section is below said predetermined limit. By a reference to Fig. 2 we find one selector section S4 wherein the grid of a three element tube V41 has been utilized to perform both of these functions. V40 is here performing the function of V5 in Fig. 1. R42 is a current limiting resistance. The value of B45 here determines the voltage impressed on R43 by V40, for a given output voltage of V40. As the voltage impressed on R43 increases, it becomes sufficiently great to overcome the negative bias placed by CB41 on V41, thereby allowing a considerable current to flow thru R41, and overcome the negative bias placed on V42 by CB42, and thereby allow a considerable current to flow from battery B42 thru selector magnet SM4 and print one letter on the printer telegraph.

If, on the other hand, the voltage across R43 increases beyond a predetermined limit N43 which is an element which has a high resistance until a predetermined voltage is impressed thereon at which time it breaks down and has a low resistance such as a neon lamp, will break down and keep the potential of V41 at such a negative potential as to greatly impede the passage of electrons through V41, thereby allowing the selector magnet SM4 to remain inoperative. R44 prevents large currents from flowing from grid to filament when the grid becomes positive. Thus we find that the selector section S4 is operative for one voltage impressed thereon similar to the selector sections shown in Fig. 1.

Figure 3:
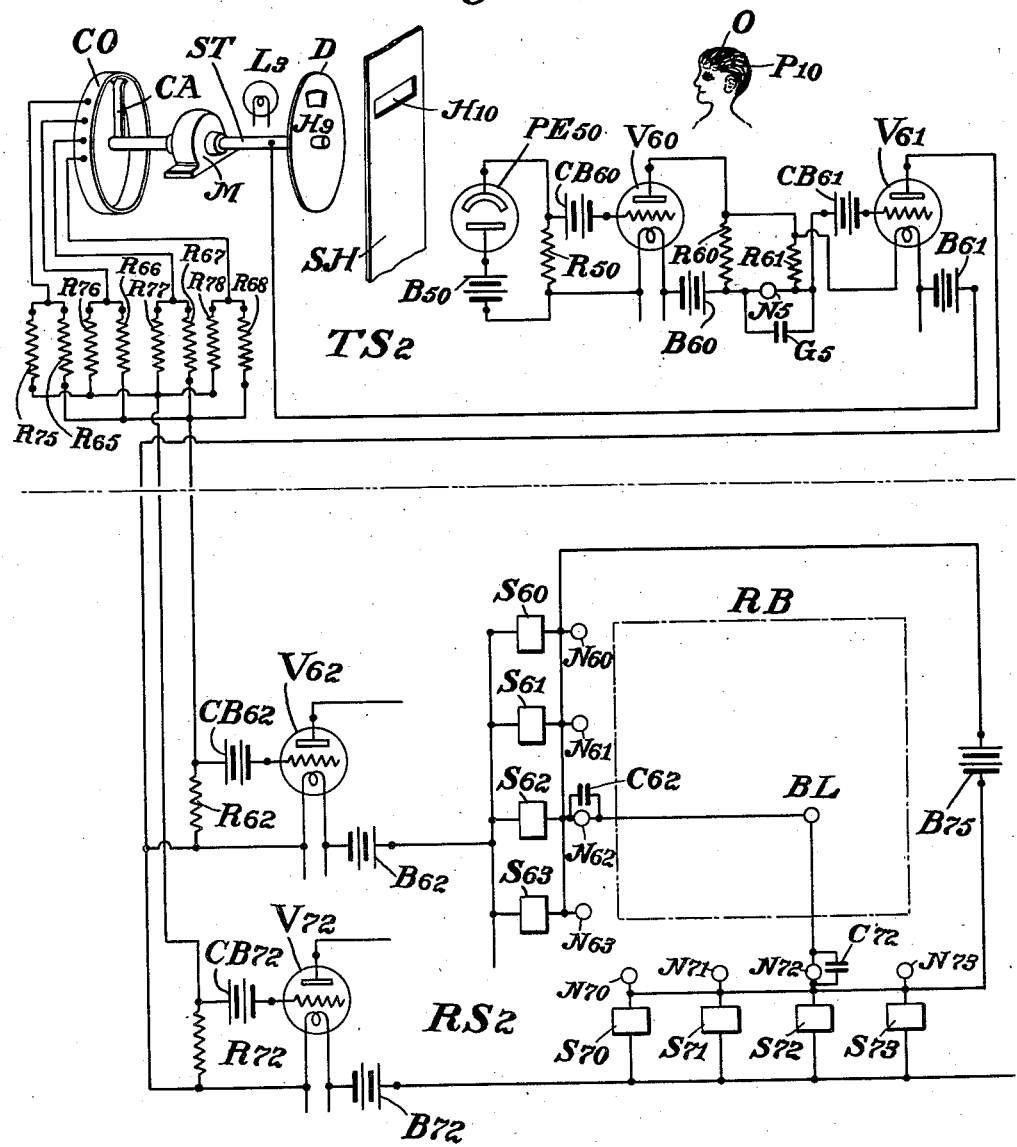
Fig. 3 shows how the system may be adapted to television.

Fig. 3 illustrates how the selector system may be applied to television circuits. Source of light L3 shines through hole H9 in scanning disc D, and hole H10 of shutter SH so that a given point P10 on object O, will be illuminated. Photo-electric cell PE50 impresses a varying voltage on R50 in accordance with the intensity of light reflected by point P10 on object O. CB60 impresses a negative voltage on V60. If the action of the light is strong enough N5 will break down discharging condenser G5 and thereby allow a voltage drop across R61, and allow B61 to send a current through commutator distributor CO. The motion of contact arm CA is so synchronized with disc D, thru shaft ST, that when said light is impressed on point P10 of object O, that contact is made thru resistance R65 and R75, respectively. This determines the voltage impressed by V62 and V72 on their selector sections S60, S61, S62, S63, and S70, S71, S72, S73. These selector sections instead of operating the selector magnet of a printing telegraph, here break down the resistance of neon lamp N62 and N72, thereby allowing a source of voltage B75 to send a current through board lamp BL of receiving board RB. Condensers C62 and C72 have the function of prolonging the time that N62 and N72 are broken down.

The board lamp BL corresponds to point P10 on object O. By similarly lighting other lamps (not shown) on receiving board RB object O will appear thereon.

While but two banks of selector sections, S60, S61, S62, S63, and S70, S71, S72, S73, have been used in the present instances, it is obvious that additional banks could also be used, thereby increasing the number of board lamps that a given number of selector sections could light. Furthermore, the current through R65 and R75 has a predetermined sum and a predetermined difference and these values could be used for the purpose of lighting the banks by means of inserting additional resistors between R75 and additional commutator segments on CO.

While the selector system has been illustrated in connection with the printer telegraph and television units it is apparent that it can be used in many other ways such as in the transmission of radio messages, and in automatic telephone switchboards thereby doing away with most of the mechanical relays connected therewith. It is therefore not desired to limit the invention to the forms disclosed, the invention being described in the following claims.

What is claimed is:

1. The method of transmitting a signal from one station to another which consists in producing lights of predetermined magnitudes, thereby generating a voltage at the transmitting station, and utilizing said voltage to produce a proportionate voltage across an element at the receiving station, thereby operating one of a plurality of devices, determined by the magnitude of said voltage generated at said transmitting station.

2. The method of generating voltages for production of large space currents in any one of a plurality of vacuum tubes which method consists in producing lights of various intensities, and in producing voltages corresponding in magnitude to the intensities of said lights and applying said voltages to the input circuits of said vacuum tubes.

3. The combination with a vacuum tube magnitude discriminating system, capacitated to operate a plurality of devices, means for producing a light of various intensities, means for producing a voltage in accordance with the intensity of said light, means for operating any one of said devices depending on the intensity of the light so produced.

4. The combination with a plurality of vacuum tubes each having an anode, a cathode and a control electrode, means for producing voltages of various magnitudes, means for causing the space charges of each of said vacuum tubes to be least negative for different magnitudes of said voltages.

5. The combination with a means of producing a light of predetermined intensity, means for generating a current of magnitude determined by the intensity of said light, a plurality of vacuum tubes, each having a plurality of grids, means for differentially affecting the potential of the grids of one of said tubes by said current.

6. In an electric system, a plurality of vacuum tubes each having a plurality of grids, means for producing a current of different magnitudes, means for differentially affecting the potential of the grids of each of said vacuum tubes in accordance with said current, means for causing the space charge of one of said tubes to be least negative for one of said magnitudes, means for causing the space charge of another of said tubes to be least negative for a different magnitude of said current.

7. In a selective system, a plurality of vacuum tubes each capacitated to operate a separate device, means for producing a light of various magnitudes, means for producing a voltage corresponding in magnitude to the magnitude of said light, means for operating any one of said devices depending on the magnitude of said voltages so produced.

8. In an electric circuit, a voltage magnitude discriminating device, comprising a plurality of vacuum tubes, a separate device operated by the space current of each of said vacuum tubes, means for producing a voltage to control the space charges of said vacuum tubes, said means comprising a photo-electric cell, the resistance of said photo-electric cell being controlled by a plurality of intensities of light impressed thereon.

9. The method of varying the plate impedance of a vacuum tube having a plurality of grids, which consists in producing a current of varying magnitude and in utilizing said current to impress a negative charge on one of said grids, and a positive charge on another of said grids, thereby causing the impedance of said vacuum tube to be smallest for a given magnitude of said current.

10. The combination with the means of generating a voltage of varying magnitude, a vacuum tube having a plurality of grids; means of applying said voltage to the grids of said vacuum tube thereby causing one of said grids to tend to assume a positive potential and another of said grids to tend to assume a negative potential.

In testimony whereof, I affix my signature.

OLIVER T. FRANCIS.